(12) United States Patent
Beato et al.

(10) Patent No.: US 8,477,149 B2
(45) Date of Patent: Jul. 2, 2013

(54) REAL-TIME CHROMAKEY MATTING USING IMAGE STATISTICS

(75) Inventors: Nicholas Beato, Orlando, FL (US); Charles E. Hughes, Maitland, FL (US); Mark Colbert, San Mateo, CA (US); Yunjun Zhang, Orlando, FL (US); Kazumasa Yamazawa, Nara (JP)

(73) Assignee: University of Central Florida Research Foundation, Inc., Orlando, FL (US)

( * ) Notice: Subject to any disclaimer, the term of this patent is extended or adjusted under 35 U.S.C. 154(b) by 513 days.

(21) Appl. No.: 12/752,238

(22) Filed: Apr. 1, 2010

(65) Prior Publication Data

US 2010/0277471 A1  Nov. 4, 2010

Related U.S. Application Data

(60) Provisional application No. 61/165,740, filed on Apr. 1, 2009, provisional application No. 61/318,336, filed on Mar. 28, 2010.

(51) Int. Cl.

| G09G 5/00 | (2006.01) |
|---|---|
| G09G 5/02 | (2006.01) |
| G03F 3/08 | (2006.01) |
| H04N 1/38 | (2006.01) |
| H04N 1/40 | (2006.01) |
| H04N 9/74 | (2006.01) |
| H04N 9/75 | (2006.01) |
| H04N 5/445 | (2011.01) |
| G06K 9/40 | (2006.01) |
| G06K 9/62 | (2006.01) |
| G06K 9/38 | (2006.01) |
| G06K 9/32 | (2006.01) |

(52) U.S. Cl.
USPC ........... 345/592; 345/606; 345/629; 345/633; 345/640; 345/673; 348/115; 348/180; 348/565; 348/586; 348/592; 358/463; 358/525; 358/540; 382/159; 382/228; 382/254; 382/272; 382/300

(58) Field of Classification Search
USPC .................. 386/201, 224, 271, 273–274, 263, 386/300, 353; 715/756–757; 345/418–419, 345/427, 581, 586, 589–590, 592, 600, 606, 345/619, 620, 623–626, 629–630, 632–633, 345/634, 638–640, 643–644, 672–673; 348/115, 348/169, 180–182, 208.99, 208.14, 533–539, 348/553, 557, 560, 563–565, 571, 578, 580, 348/582, 584–586, 587, 590–592, 597–599, 348/607, 625, 683, 696; 358/504, 518, 525, 358/533, 537, 540, 447–448, 461, 463; 382/162, 382/167, 224, 228, 254, 272, 274, 276, 285, 382/300, 154, 159
See application file for complete search history.

(56) References Cited

U.S. PATENT DOCUMENTS

| 5,355,174 A | * | 10/1994 | Mishima .................... 348/592 |
| 6,034,739 A | * | 3/2000 | Rohlfing et al. .............. 348/586 |

(Continued)

*Primary Examiner* — Wesner Sajous
(74) *Attorney, Agent, or Firm* — Timothy H. Van Dyke; Beusse, Wolter, Sanks, Mora & Maire, P.A.

(57) ABSTRACT

A method, system and computer readable media for real-time chromakey matting using image statistics. To identify the chroma key spectrum, the system/method executes in three stages. In an off-line training stage, the system performs semi-automatic calibration of the chroma key parameterization. In the real-time classification stage, the system estimates the alpha matte on a GPU. Finally, an optional error minimization stage improves the estimated matte, accounting for misclassifications and signal noise. Given the resulting matte, standard alpha blending composites the virtual scene with the video feed to create the illusion that both worlds coexist.

20 Claims, 6 Drawing Sheets

U.S. PATENT DOCUMENTS

| | | | |
|---|---|---|---|
| 6,052,648 A * | 4/2000 | Burfeind et al. | 702/3 |
| 6,122,014 A * | 9/2000 | Panusopone et al. | 348/592 |
| 6,335,765 B1 * | 1/2002 | Daly et al. | 348/586 |
| 6,437,782 B1 | 8/2002 | Pieragostini et al. | |
| 6,501,512 B2 | 12/2002 | Nguyen et al. | |
| 6,807,296 B2 | 10/2004 | Mishima | |
| 6,897,984 B2 | 5/2005 | Warthen | |
| 6,927,803 B2 | 8/2005 | Toyama et al. | |
| 7,006,155 B1 | 2/2006 | Agarwala et al. | |
| 7,508,455 B2 | 3/2009 | Liu et al. | |
| 2005/0212820 A1 * | 9/2005 | Liu et al. | 345/620 |
| 2007/0070226 A1 * | 3/2007 | Matusik et al. | 348/275 |
| 2007/0184422 A1 * | 8/2007 | Takahashi | 434/262 |
| 2008/0246759 A1 * | 10/2008 | Summers | 345/420 |
| 2009/0237566 A1 * | 9/2009 | Staker et al. | 348/584 |
| 2010/0111370 A1 * | 5/2010 | Black et al. | 382/111 |
| 2010/0245387 A1 * | 9/2010 | Bachelder et al. | 345/633 |
| 2011/0025918 A1 * | 2/2011 | Staker et al. | 348/584 |

* cited by examiner

REAL-TIME CHROMAKEY MATTING USING IMAGE STATISTICS

CROSS-REFERENCE TO RELATED APPLICATIONS

This application claims priority from U.S. provisional application Ser. No. 61/165,740, filed Apr. 1, 2009, and U.S. provisional application Ser. No. 61/318,336, filed Mar. 28, 2010, the disclosures of which are incorporated herein by reference in their entireties.

STATEMENT OF GOVERNMENT RIGHTS

The work leading to this invention was partly supported by grants from the Army Research Institute (ARI) via NAVAIR (Contract No. N6133904C0034) and the National Science Foundation (Contract No. ESI-0638977). The United States Government has certain rights in this invention.

TECHNICAL FIELD

This invention relates to chromakey matting, and specifically to an improved system, method, and computer-readable media for real-time chromakey matting using image statistics.

BACKGROUND ART

In Mixed Reality (MR), virtual and real worlds are combined to obtain a seamless environment where the user interacts with both synthetic and physical objects. In mixed reality, an individual must believe that the real and virtual worlds are one and the same. While MR is defined to span from the purely virtual to real-world experiences, most MR environments are in one of two categories: augmented reality where virtual elements are inserted into the physical space or augmented virtuality, where real elements are composited into a virtual scene. A technology that enables this full spectrum of MR is the video see-through head-mounted display (HMD), a wearable device that captures the user's view of the environment through mounted cameras and displays the processed images to the user via screens in from of the eyes. The HMD is especially useful in augmented virtuality where real objects must be separated from the regions where virtual objects will appear in the synthesized image. Typically, blue or green colored physical objects can be used to identify the virtual surround, thereby making chroma keying an effective technique for defining this matte.

When using HMDs, the cameras transmit fairly low resolution video streams with high signal noise. The multiple streams must be processed in real-time for an interactive user experience. However, matting is under-constrained and ill-conditioned due to limited spatial resolution and a large amount of signal noise. Commercial hardware, such as Ulti-mane®, produces high fidelity mattes by using heuristically-based chroma keys for a single video stream. These hardware solutions are costly, especially when considering multiple users with multiple cameras per HMD. One technology that enables this perception is the video see-through head mounted display (VST-HMD). Another technology that aids in the merging of both environments is chroma key matting. A common downfall of the VST-HMD is that low resolution and high pixel noise cause difficulties with chroma keying solutions.

Chroma keying, often called blue screening, refers to classifying a range of colors, commonly in the blue or green color spectrum, from a captured image to define a matte for compositing multiple image sources. The problem is under-constrained and most commonly addressed through commercial products that require tweaked parameters and specialized hardware for real-lime processing. In Mixed Reality (MR) applications using video see-through head-mounted display (HMD) hardware, the problem becomes more difficult since the poor camera quality within the HMDs, interactive processing requirements of MR, and multiple camera sources demand a robust, fast, and affordable solution.

A number of patents exist which relate to chromakey matting, including, U.S. Pat. Nos. 7,508,455, 7,006,155, 6,927,803, 6,897,984, 6,807,296, 6,501,512, 6,437,782; all of which are incorporated herein by reference.

Prior techniques require low signal noise, significant calibration or do not run in real-time.

Hence, there is a need for an affordable, robust, and fast matting process that works with low-quality video signals, less than perfect lighting environments and non-uniform matting material (e.g., low-cost, light weight cloth rather than rigid surrounds).

The present invention is designed to address these needs.

DISCLOSURE OF THE INVENTION

Broadly speaking, the invention comprises an improved system, method, and computer-readable media for real-time chromakey matting using image statistics. While other research has developed fast software solutions, the present invention uses a processor, and preferably uses the graphics processing unit (GPU), thus freeing CPU cycles for other real-time elements of the MR environment. e.g. audio and story. The method obtains interactive performance by preconditioning and training the chroma key via principal component analysis (PCA). Once the color is transformed to an optimal color space, the boundary region for the key can be defined by simple geometric shapes to obtain high fidelity mattes. Using captured camera data, the method is as robust as offline commercial chroma key packages while executing in real-time on commodity hardware.

Given a video signal, an alpha matte is generated based on the chromakey information in real-time via pixel shaders. To accomplish this, PCA is used to generate a linear transformation matrix where the resulting color triplet's Euclidean distance is directly related to the probability that the color exists in the chromakey spectrum. The result of this process is a trimap estimate of the video signal's opacity. To solve the alpha matte from the trimap, the invention minimizes an energy function constrained by the trimap with gradient descent, again using pixel shaders. This energy function is based on the least-squared error of overlapping neighborhoods around each pixel. The result is an alpha matte that is easy to calibrate, is robust to noise, is calculated entirely within a commodity graphics processing unit (GPU) and operates at exceptionally high frame rates.

Generally, to identify the chroma key spectrum, the system/method executes in three stages. In an off-line training stage, the system performs semi-automatic calibration of the chroma key parameterization. In a real-time classification stage, the system estimates the alpha matte on a GPU. Finally, an optional error minimization stage improves the estimated matte, accounting for misclassifications and signal noise. Given the resulting matte, standard alpha blending composites the virtual scene with the video feed to create the illusion that both worlds coexist.

The invention can be implemented in numerous ways, including as a system, a device/apparatus, a method, or a computer readable medium. Several embodiments of the invention are discussed below.

As a method, an embodiment comprises real-time chromakey matting using image statistics where still and moving subjects shot against a solid color background by a camera are clipped out and overlaid on a new complex background. Chroma keying produces an opacity value for every pixel describing the percent of the foreground that is visible when compositing onto a background. The color space is classified using geometric objects whose boundaries define the opacity (i.e., classifiers are constructed using simple geometric shapes to construct the decision boundaries surrounding the key color spectrum—for example, three types of parameterized fundamental shapes: mean-centered ellipsoids, bounding boxes, and bounding box centered ellipsoids). To optimally use these shapes, they are fitted to encompass the key color spectrum used for matting. PCA is used as a way to precondition the image colors such that the opacity is defined via spheres or cubes—PCA is a statistical method to find an orthogonal vector basis and therefore a new coordinate system, such that the center of the key color spectrum is the origin and each axis is maximally de-correlated with respect to optimal decision boundaries (i.e., to simplify the shapes, the invention preconditions the colors by applying a Euclidean transformation). A training system is used that performs semi-automatic calibration of the decision boundary that is used for processing the chroma key in real-time. The alpha matte is computed in real-time using a pixel shader. It classifies pixels as either background or foreground and renders each object to an appropriate image. Given these four images (foreground, background, video, and matte), the GPU composites the data using a three layer blending function.

As a system, an embodiment of the invention includes a database containing tables of data, memory, a display device and a processor unit. The invention is directed to a combination of interrelated elements which combine to form a machine for real-time chromakey matting using image statistics.

The methods of the present invention may be implemented as a computer program product with a computer-readable medium having code thereon.

As an apparatus, the present invention may include at least one processor, a memory coupled to the processor, and a program residing in the memory which implements the methods of the present invention.

The advantages of the invention are numerous. One significant advantage of the invention is that it operates in real-time; functions in visually noisy setting; and simplifies calibration. Moreover, it can be used in any context where real content needs to be placed in a visually synthetic context. A further advantage of the invention is that it allows a user to perform real-time chromakey compositing on low budget hardware and chroma material with minimal user preparation. The invention may be used in training, film, research, theme parks, video/image editing, gaming, and tracking. It may further be used with products for cognitive/physical assessment and rehabilitation.

Other aspects and advantages of the invention will become apparent from the following detailed description taken in conjunction with the accompanying drawings, illustrating, by way of example, the principles of the invention.

All patents, patent applications, provisional applications, and publications referred to or cited herein, or from which a claim for benefit of priority has been made, are incorporated herein by reference in their entirety to the extent they are not inconsistent with the explicit teachings of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENT

Figure 1:
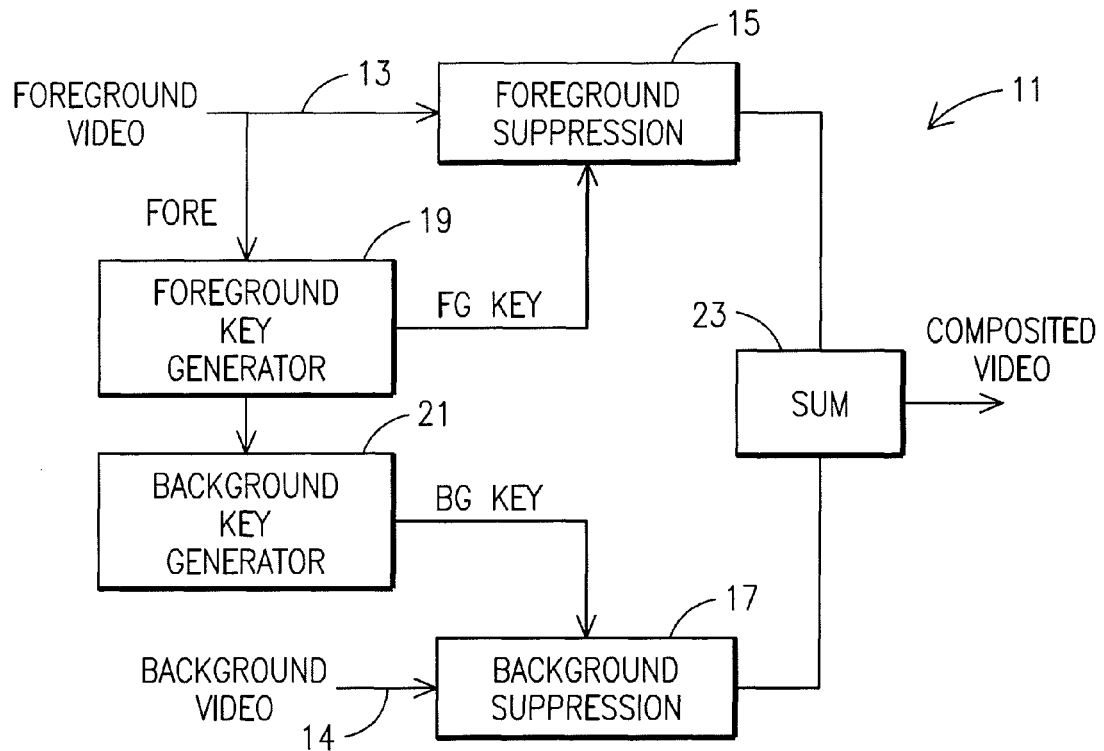
FIG. 1 is a block diagram of a conventional chroma key system.

Referring now to the drawings, the preferred embodiment of the present invention will be described.

FIG. 1 is a block diagram of a conventional chroma key system 11. A foreground image and a background image are received on signal lines 13 and 14, respectively, at a foreground suppression module 15 and at a background suppression module 17. A foreground key generator 19 and a background key generator 21 provide a foreground key and a background key for the foreground suppression module 15 and the background suppression module 17, respectively. The foreground suppression module 15 and the background suppression module 17 provide partially (or fully) suppressed foreground and background images that are received by an image sum module 23. The result is a chroma keyed image that may combine and issue the foreground and background images in a composite video image according to the particular keying algorithm adopted.

Figure 2:
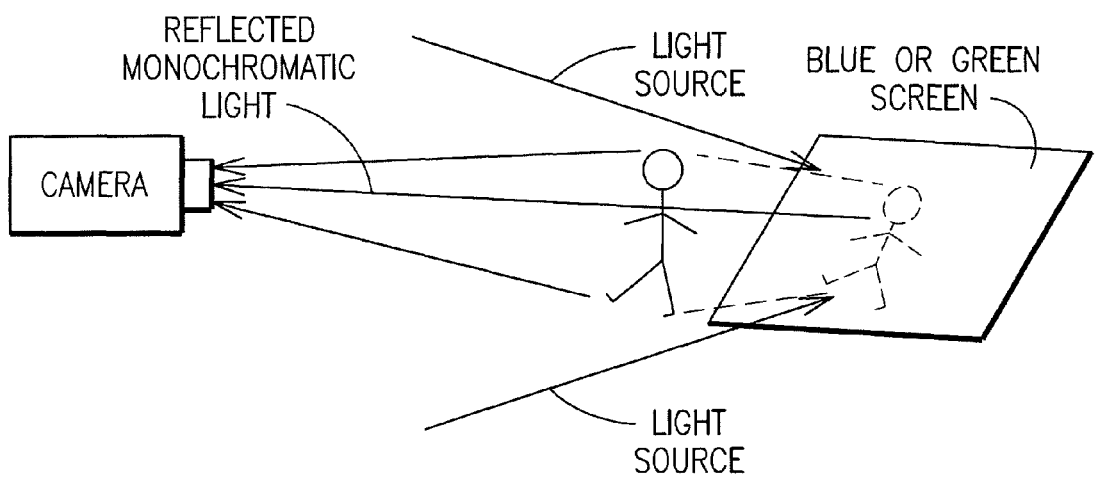
FIG. 2 is a schematic of a chroma key process of the prior art.

In FIG. 2, an example conventional chroma key system is shown. Light rays from a light force are reflected as monochromatic light stream off of screen to a camera. The subject is in front of the screen reflects a light stream to the camera.

Matting objects using key colors is a common tool used in the film and television industry for special effect composition. The chroma key problem, also called constant color matting problem or blue screen matting, is under-constrained because the foreground color and the matte must be determined by a single observation. While well-conditioned solutions exists when using multiple images with various backgrounds, or depth information, specialized hardware is required to obtain real-time performance.

To solve the under-constrained problem, a series of empirically-defined constraints on the color space can be used. Other techniques, such as the vision-based keying techniques and the bounding volume techniques, provide more robust methods at the cost of performance. Similarly, the field of natural image matting obtains robust mattes offline without key colors present in the image.

The method of the present invention extends the previous heuristic-based matting algorithms, as well as the automatic shape determination method, to make chroma keying amenable to mixed reality (MR). Using PCA, the present invention preconditions the chroma key and thus provides a solution that is both robust to camera noise and executes in real-time on commodity hardware.

Figure 4A:
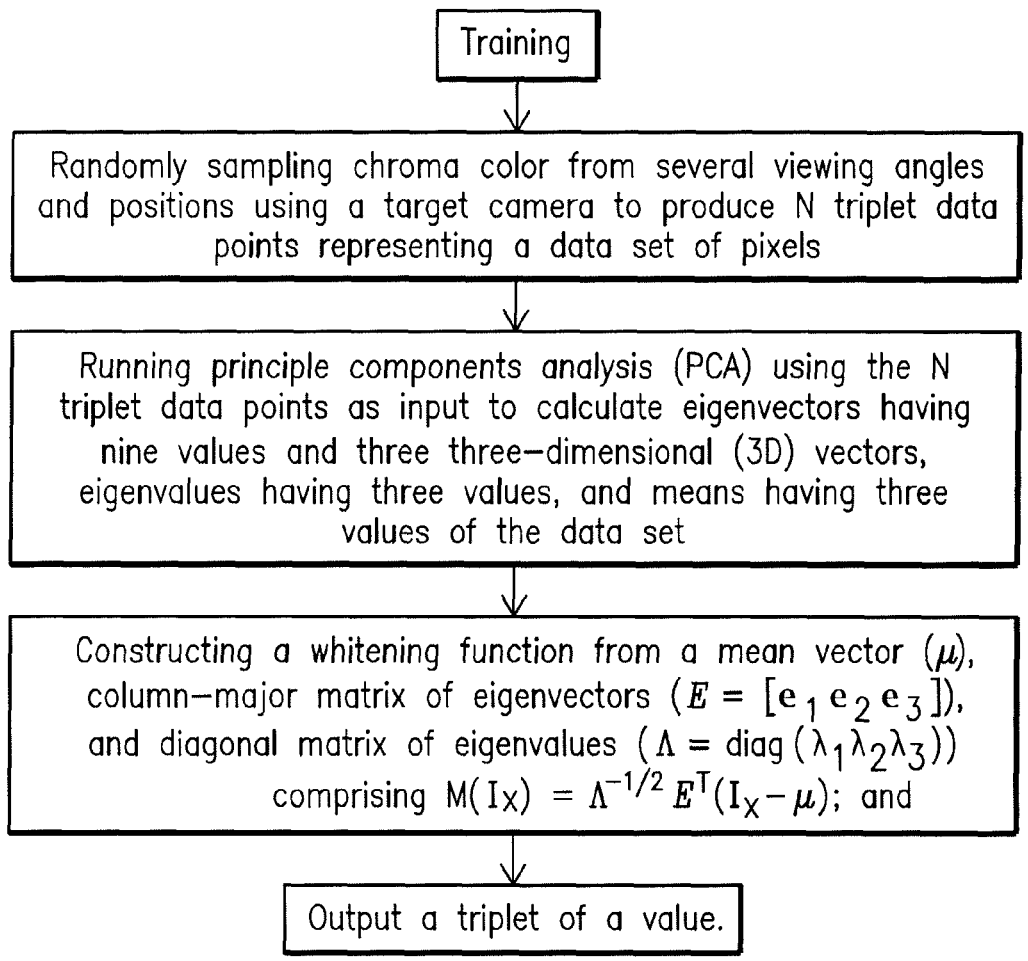
FIGS. 4*a* and 4*b* show a flowchart of an embodiment of the invention.
Figure 4B:
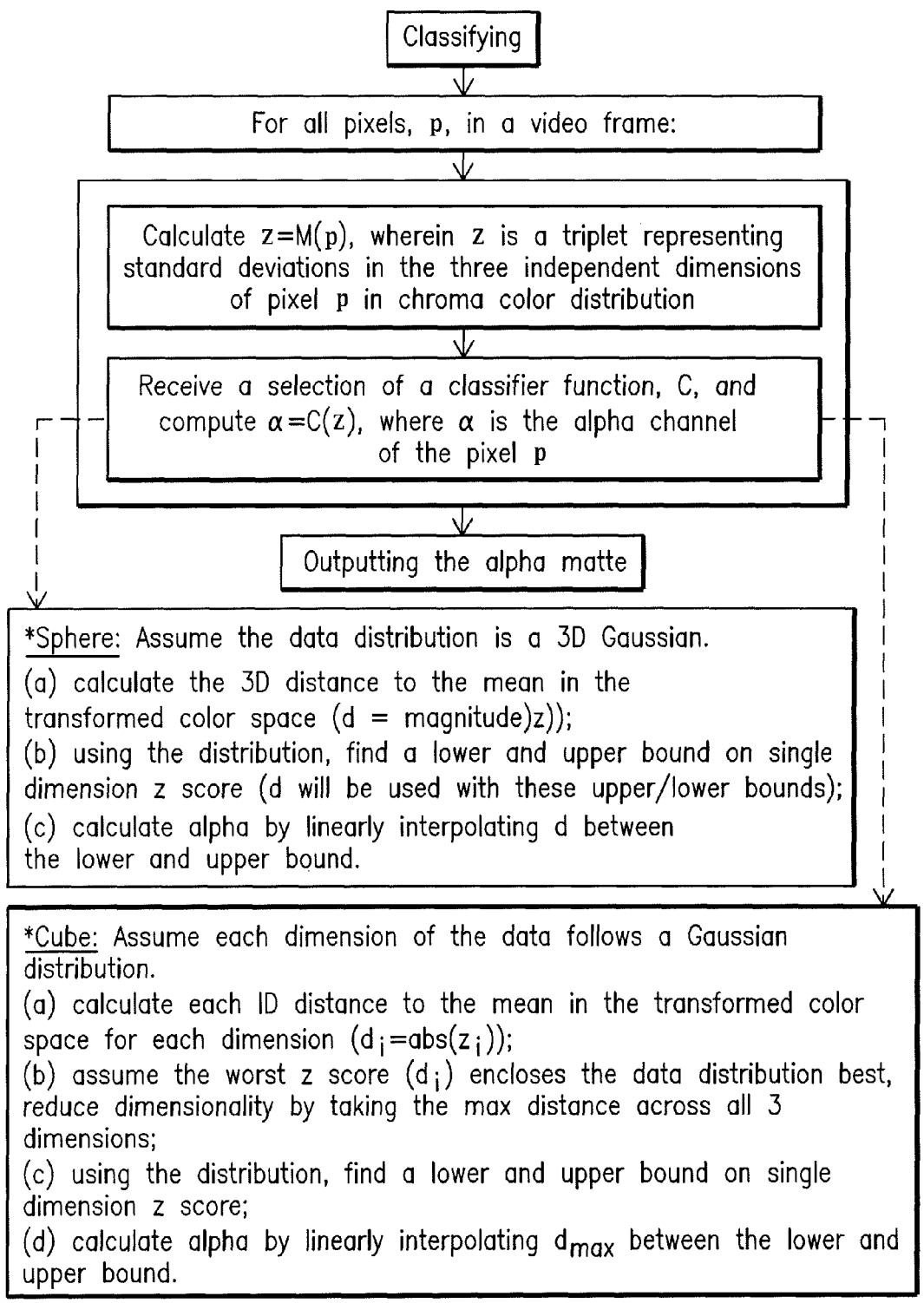

In an embodiment, the steps include training and classifying as shown in FIGS. 4a-4b. Training generally includes the following steps: (a) Randomly sample chroma color (from several viewing angles/positions) using the target camera producing N triplet data points (pixels); (b) Run principle components analysis using the N data vectors as input, which calculates the eigenvectors (9 values, three 3d vectors), eigenvalues (3 values), and means (3 values) of the data set; (c) Construct a "whitening" function M(p)=eigenvalues^(−½)*eigenvectors^T*(p−mean). Outputs a triplet of non-negative value.

Classifying generally includes the following steps: (a) For all pixels, p, in a video frame, (i) Calculate z=M(p), z is a triplet representing the standard deviations (in 3 independent dimensions) of p in the chroma color distribution (similar to a Bell curve for each dimension, ordered by importance), (ii) Choose one of the classifier functions, C, and compute a=C(z), where a is the alpha channel of the pixel (will elaborate on C); (b) Previous step produces an alpha matte for the video, which lets the video composite on top of the virtual background using standard alpha blending.

Classifiers can comprise a sphere or cube or the like, as described herein, which reduce dimensionality from 3 to 1 and create an alpha value.

For a sphere, assume the data distribution is a 3D Gaussian, then (a) calculate the 3d distance to the mean in the transformed color space (d=magnitude(z)), (b) using the distribution, find a lower and upper bound on single dimension z score (d will be used with these upper/lower bounds) (may be done by user); (c) calculate alpha by linearly interpolating d between the lower and upper bound.

For a cube, assume each dimension of the data follows a Gaussian distribution, then (a) calculate each 1d distance to the mean in the transformed color space for each dimension (d_i=abs(z_i)); (b) assume the worst z score (d_i) encloses the data distribution best—reduce dimensionality by taking the max distance across all 3 dimensions (the first 2 works also); (c) using the distribution, find a lower and upper bound on single dimension z score; (d) calculate alpha by linearly interpolating d between the lower and upper bound.

An optional step includes an error minimizer as described in more detail herein.

Pseudocode may be represented in the following Table 1:

TABLE 1

Psuedocode

```
Training:
for(random pixel in chroma video)
    samples.insert(<r,g,b>)
stats = pca(samples)
Classifier:
for(all pixels in a frame)
    z = whiten_transform(stats, <r,g,b>)
    d = classifier_shape(z)
    alpha = (d − lower) / (upper − lower)
    clamp(alpha) // put in range [0, 1]
Classifer: Sphere
classifier_shape(z)
    return magnitude(z)
Classifier: Cube
classifier_shape(z)
    return max(abs(z[0]), abs(z[1]), abs(z[2]))
```

In the above pseudocode, whiten, pca, max, magnitude, etc. are well known. In the classifier shapes, the mean in (0,0,0) after projecting the pixel and each dimension is maximally de-correlated.

Real-time Chroma Keying with PCA will now be described. Chroma keying produces an opacity value for every pixel describing the percent of the foreground that is visible when compositing onto a background. Since chroma keying is a color-based approach, the color space is classified using geometric objects whose boundaries define the opacity. To maintain the necessary computational efficiency required of MR, classifiers are constructed using simple objects such as ellipsoids or boxes. However, to optimally use these shapes, they are fitted to encompass the key color spectrum used for matting.

An embodiment herein uses PCA as a way to precondition the image colors such that the opacity is defined via spheres or cubes. PCA is a statistical method to find an orthogonal vector basis and therefore a new coordinate system, such that the center of the key color spectrum is the origin and each axis is maximally de-correlated with respect to optical decision boundaries. A training system is used that performs semi-automatic calibration of the decision boundary that is used for processing the chroma key in real-time on the GPU.

In a particular embodiment, formally, chroma keying produces an opacity value, $\alpha_x$, for every pixel, $I_x$, of each image, I, that is a frame in a video. Opacity describes the percent of the real foreground that is visible when compositing onto a virtual background. In immersive environments that use chroma key matting for visual effect, factors such as lighting, white-balance, and camera-angle are considered. As a result, the digitized key color is a persistent, invariant property of the physical material's reflectance projected onto the camera. A goal is to find a simple parameterized function that allows a GPU to partition the chroma key colors from the non-chroma key colors, estimating the opacity of each pixel for matting. Then the global error of the estimated solution is minimized to obtain a plausible alpha matte for user interaction.

To identify the chroma key spectrum, an embodiment of the system/method executes in three stages. In the off-line training stage, the system performs semi-automatic calibration of the chroma key parameterization. In the real-time classification stage, the system estimates the alpha matte on a GPU. Finally, the error minimization stage improves the estimated matte, accounting for misclassifications and signal noise. Given the resulting matte, standard alpha blending composites our virtual scene with our video feed to create the illusion that both worlds coexist.

Training will now be described. To obtain a robust chroma key matte, a classifier is used whose boundaries contain the key color spectrum. In defining the classifier, an embodiment uses three types of parameterized fundamental shapes: mean-centered ellipsoids, bounding boxes, and bounding box centered ellipsoids. To simplify the shapes, the embodiment preconditions the colors by applying a Euclidean transformation. This transformation is trained using multiple images containing a subset of the key color spectrum. The color data is then used to construct a rotation, translation, and scale based upon the principal components, mean value, and inverse eigenvalues of the covariance matrix (residuals). Therefore, the new space represents an approximation of the isotropic chroma key space. In this space, the probability of a color being within the key color spectrum decreases radially with respect to the distance from the origin. Notably, this space will be identical regardless of the input data if in some linearly related space, e.g. RGB, XYZ, YUV, or $YC_rC_b$.

In a particular embodiment, training proceeds as follows: To obtain a believable alpha matte based on a video stream containing chroma key pixels, we statistically analyze the invariant properties of the chroma key material as digitized by the camera. Since the camera's view of the chroma key must be consistent, it may be assumed that scene lighting and set design are complete and that any camera or driver settings that automatically adjust images, e.g., white balance, are disabled. A statistical method is then applied, namely PCA, to a subset of the known chroma key pixels. PCA finds an orthonormal vector basis by performing singular value decomposition on the covariance matrix of a subset of the key color spectrum obtained either during live video acquisition or from processed captured video. We can translate, rotate, and scale an input pixel by the mean vector ($\mu$), column-major matrix of eigenvectors (E=[$e_1$ $e_2$ $e_3$]), and diagonal matrix of eigenvalues ($\Lambda$=diag ($\lambda_1$, $\lambda_2$, $\lambda_3$)) calculated by PCA, effectively whitening the input signal, $$I'_x = \Lambda^{-1/2} E^T (I_x - \mu)$$

This transformation imposes that the Euclidean distance between the transformed pixel, $I'_x$, and the origin is approximately the absolute value of the pixel's z-score, provided the chroma key data set is a normal distribution. Furthermore, the projected resulting components are the z-scores with respect to the maximally uncorrelated, orthonormal basis vectors. Notably, the resulting color space will be identical regardless of the input data if presented in some linearly related space, e.g., RGB, XYZ, YUV, or $YC_bC_r$.

Classification will now be described. Once in this isotropic space, the optimal inner decision boundary, containing colors within the key color spectrum, and the optimal outer decision boundary, constraining the key color spectrum, can be defined by simple parameterized shapes. Here, the region between the boundaries represents areas of translucent opacity values. When the user adjusts the parameters, the volumes of the shapes increase or decrease in the isotropic chroma key space. This intuitively adds or removes colors similar to the ones already within the training data. The default parameters enclose the training data as tightly as possible.

Figure 3A:
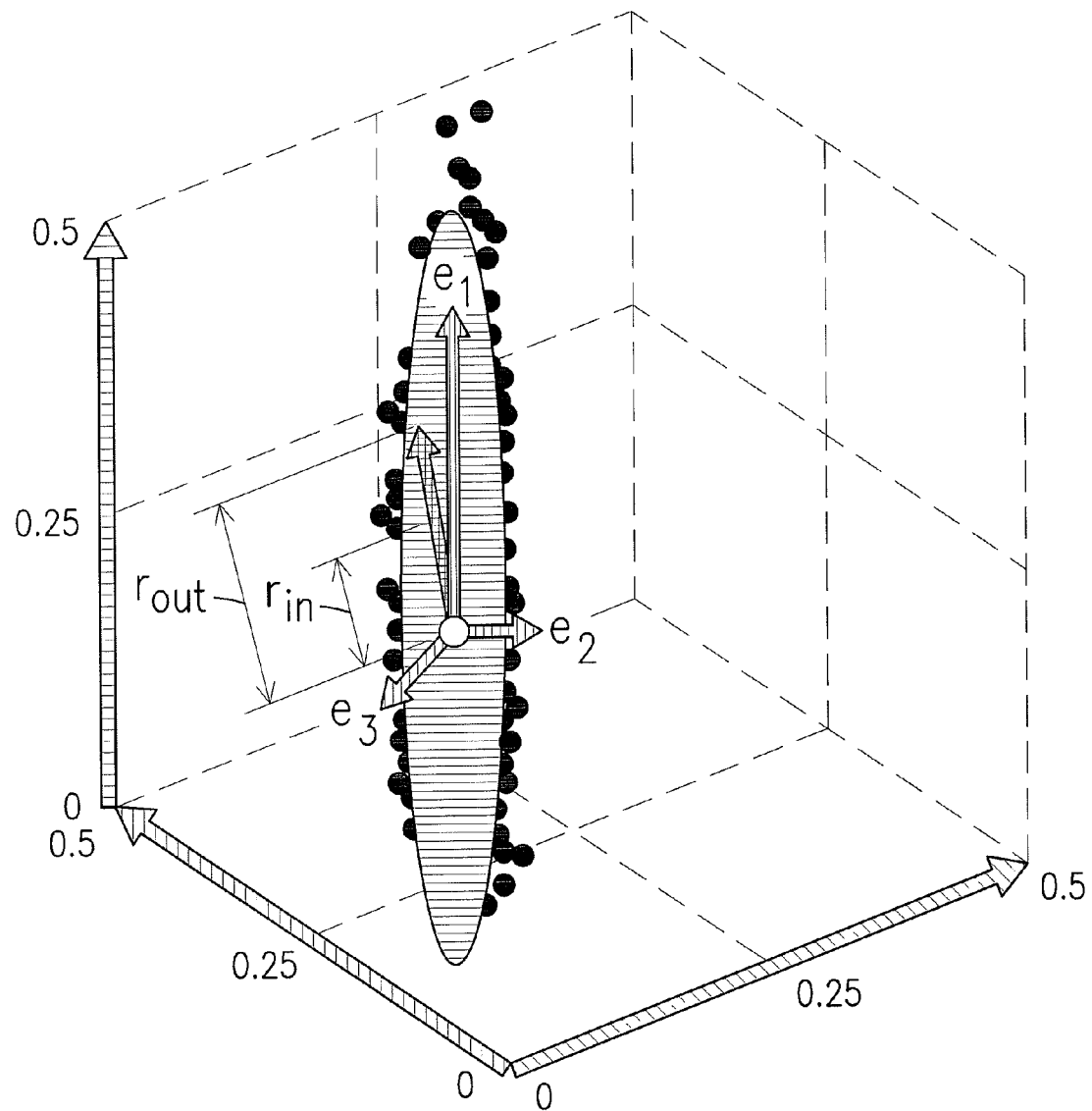
FIGS. 3*a*-3*c* show various decision boundaries.

Mean-centered ellipsoids with reference to FIG. 3 will now be described. To directly exploit the isotropic nature of the trained space, defined are two spheres parameterized by their radii. In an RGB color space, these are represented by ellipsoids centered at the mean of the training data (FIG. 3a). When the user adjusts the radius of a sphere, the amount of color within the key color spectrum changes proportionally to the principal colors present in the training data. Decision boundaries were constructed for the chroma keys in the isotropic chroma key space, illustrated by the scaled eigenvectors $e_1$, $e_2$, and $e_3$ from PCA. Simple geometric shapes are then used to define the decision boundary, such as (a) mean-centered ellipsoids, (b) bounding boxes, and (c) bounding box centered ellipsoids. The opacity is determined by either the radii, $r_{out}$ and $r_{in}$, or the distances, $d_{out}$ and $d_{in}$, to the respective boundaries.

Figure 3B:
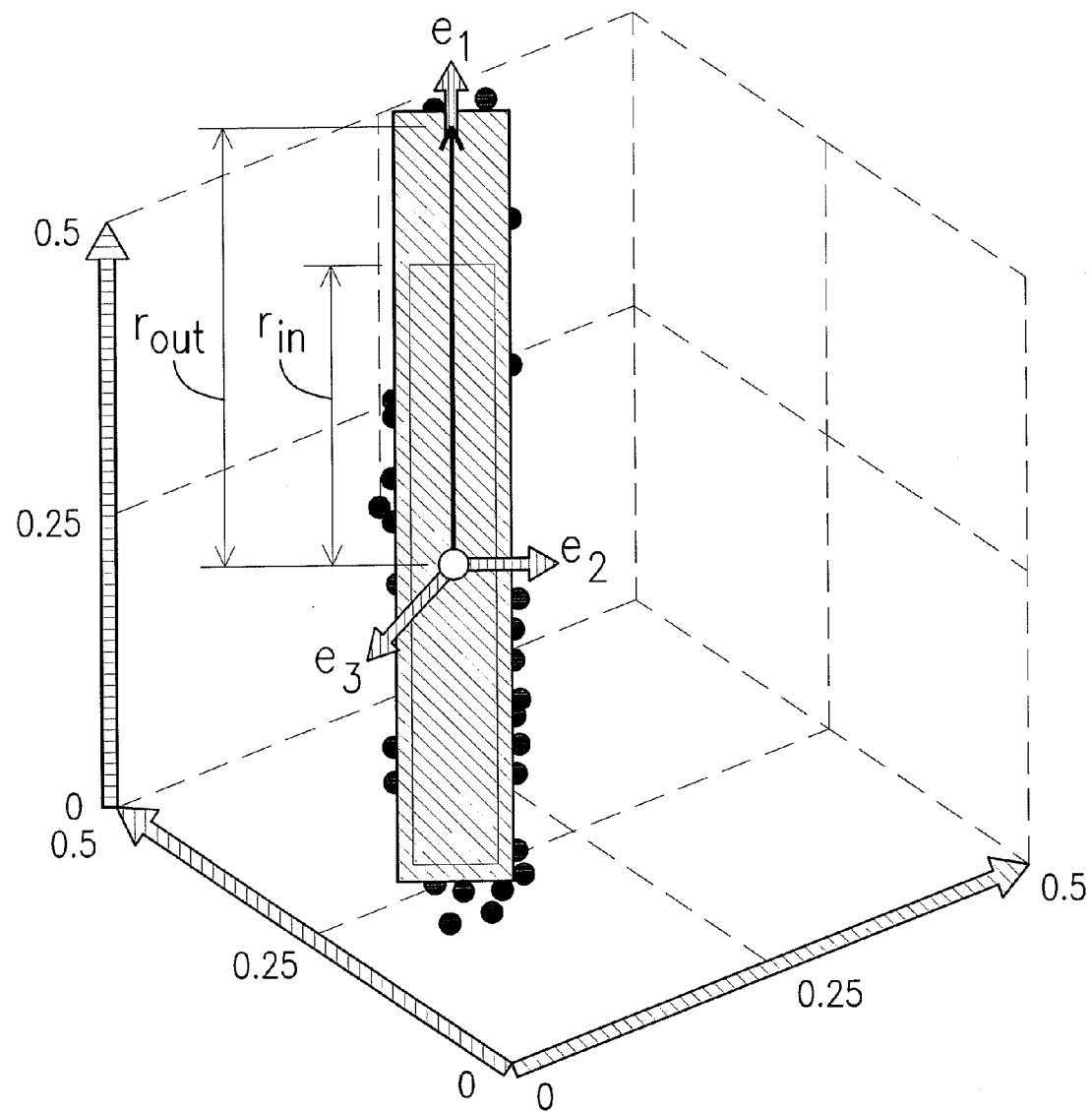

Bounding boxes with reference to FIG. 3 will now be described. One drawback of using mean-centered decision boundaries is the possibility that outliers in the training data will bias the mean of the idea key color spectrum. This error is reduced by allowing the user to cull the training data via clipping planes that remove a specified percent of the data for each axis in the isotropic space (FIG. 3b). When the clipping planes are combined, a bounding box is formed that defines the decision boundary of the classifier.

Figure 3C:
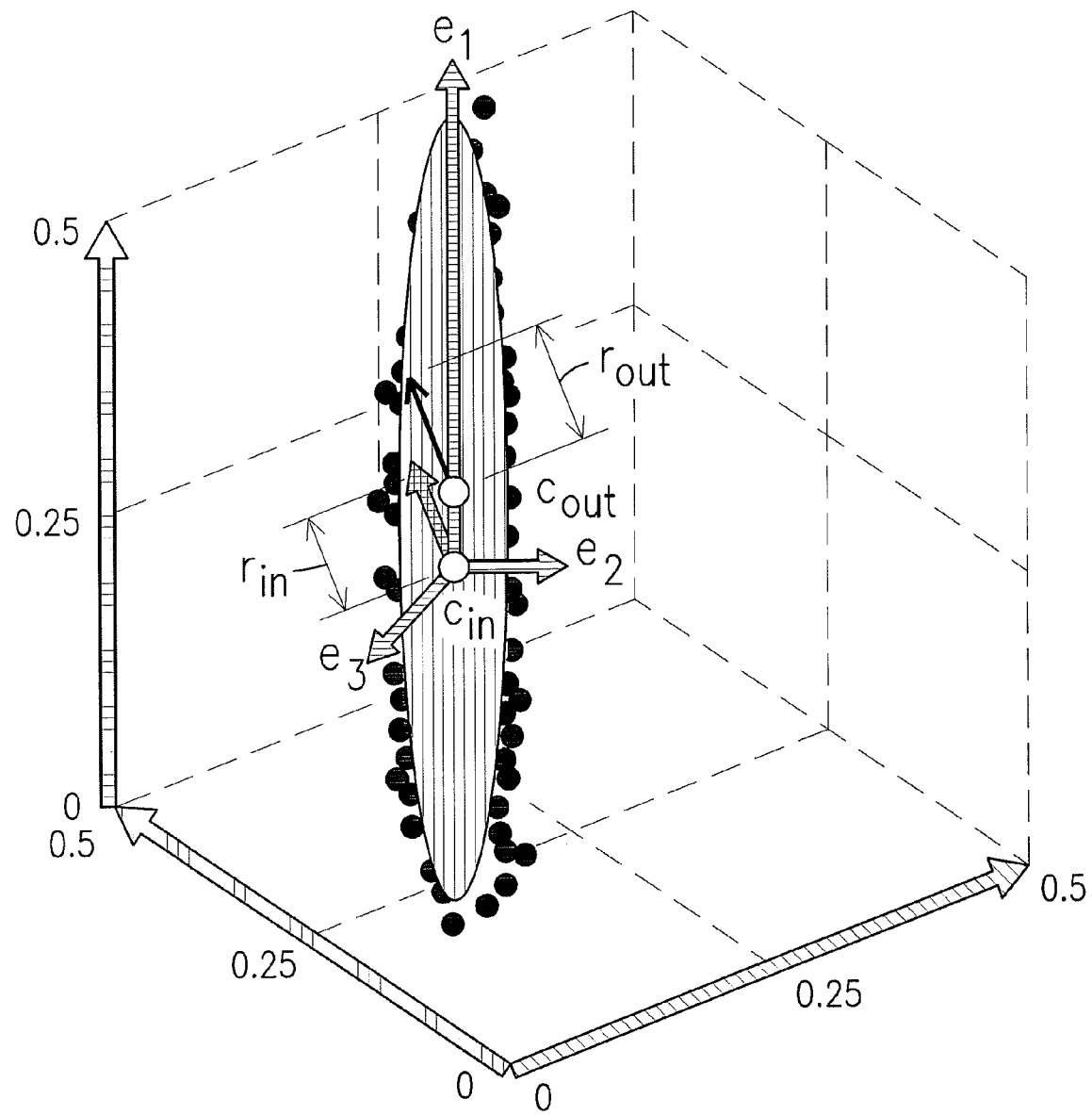

Bounding box centered ellipsoids with reference to FIG. 3 will now be described. Unfortunately, bounding boxes do not respect the radial nature of the isotropic chroma key space. Therefore, ellipsoids are fit to the bounding boxes for a decision boundary that better represents the key color spectrum (FIG. 3c).

Processing will now be described. Given the decision boundaries determined in the training session, computing the alpha matte is now a simple, inexpensive process that can easily be implemented in real-time using a pixel shader. For a given sample point, its opacity is based on its relative distances between the boundaries of the inner and outer regions. By clamping this value to the range [0,1], any point within the inner region is treated as transparent ($\alpha$=0); any outside the outer region is opaque ($\alpha$=1); and any other point has opacity based on the percentage of its distance from the inner to outer region boundary.

Computing the opacity value $\alpha$ of a sample color s from the boundary of a region depends on the shape of the region. For mean-centered ellipsoids, the Euclidean distance from the origin is used with linear interpolation between the two decision boundaries to determine the opacity value, $$\alpha = \frac{\|s\| - r_{in}}{r_{out} - r_{in}}, \quad (1)$$

where $r_{in}$ and $r_{out}$ are the radii of the inner and outer ellipsoids.

Given an inner and outer bounding box, the opacity value is computed (by a processor) from the maximum signed perpendicular distance between a color sample and every inner bounding box plane. Using this distance, defined as $n \cdot s - d_{in}$, where n is the normal of one of the bounding box plane and $d_{in}$ is the distance from the origin to the plane, the opacity value is defined as, $$\alpha = \max_{(n, d_{in}, d_{out}) \in B} \frac{n \cdot s - d_{in}}{d_{out} - d_{in}}, \quad (2)$$

where $d_{out}$ is the distance of the outer plane from the origin, and B is the set of planes axis-aligned in the isotropic chroma key space.

Given an ellipsoid correctly centered within the bounding boxes, it is not only scaled but also can deal with different centers of the ellipsoids. To accomplish this, $\alpha$ is used for linearly interpolation of the parameters on the inner and outer ellipsoids. This introduces three equations, $$c_\alpha = \alpha c_{out} + (1 - \alpha) c_{in}, \quad (3)$$

$$r_\alpha = \alpha r_{out} + (1 - \alpha) r_{in} \quad (4)$$

$$= \|s - c_\alpha\|, \quad (5)$$

where $C_{in}$ and $C_{out}$ are the centers of the inner and outer ellipsoids, $r_{in}$ and $r_{out}$ are the radii of the inner and outer ellipsoids, and the sample point s is on the surface of the ellipsoid defined by center $C_\alpha$ with radius $r_\alpha [0,1]$. These equations reduce to a single quadratic equation on $\alpha$. To calculate the opacity, the equation is solved using the answer in the range [0, 1], $$a\alpha^2 + b\alpha + c = 0, \quad (6)$$

where,
$a = \|c_{out} - c_{in}\|^2 - (r_{out} - r_{in})^2$,
$b = -2[(s-c_{in}) \cdot (c_{out}-c_{in}) + r_{in}(r_{out}-r_{in})]$,
$c = \|s-c_{in}\|^2 - r_{in}^2$.

Since virtual objects can be both in front and behind the real objects, they are classified as either background or foreground and each object is rendered to an appropriate image. Given these four images (foreground, background, video, and matte), the processor (e.g., GPU) composites the data using a three layer blending function, $$C_o = C_f + (1-\alpha_f)(\alpha_v C_v + (1-\alpha_v)C_b) \quad (7)$$

where ($C_f$, $\alpha_f$) is the foreground image color and opacity, ($C_v$, $\alpha_v$) is the video color and matte, and ($C_b$, $\alpha_b$) is the background texture, and $C_o$ is the output color.

In an alternate embodiment, classification is described as follows: Pixels statistically similar to the training set exist within a few units of the origin in the transformed color space. By utilizing simple geometric shapes near the origin, we can quickly estimate the chroma key regions in the input video based on the z-scores of the image pixels. The default parameters for these shapes specify inner, assuming the training data is within 3 standard deviations, and outer, assuming the training data is within 4 standard deviations, bounding volumes. To lower misclassifications or enhance alpha blending, an advanced user may choose to set explicit decision boundaries based on z-scores.

Given the decision boundaries and the invariant chroma key description, computing an estimate of the alpha matte is now a simple, inexpensive process that can easily be implemented in real-time using a pixel shader with negligible effect on frame rate and CPU usage. For a given transformed pixel, $I'_x$, its opacity, $\alpha_x$, is based on its relative distances from the boundaries of the inner and outer regions and clamped in the range [0, 1]. As a result, any point within the inner region is treated as transparent ($\alpha_x=0$); any point outside the outer region is opaque ($\alpha_x=1$); and any other point has opacity based on an interpolation between the inner and outer boundary. We consider two volumes that simply partition data.

Bounding Spheres will now be described. To directly exploit the isotropic nature of the trained PCA color space, we define two spheres parameterized by their radii and centered at the origin. In an RGB color space, these are represented by ellipsoids centered at the mean of the training data scaled along the eigenvectors. The radius of each sphere represents the number of standard deviations it encloses, and therefore the amount of color within the key color spectrum. To calculate opacity, $\alpha_x$, we use Euclidean distance from the origin with linear interpolation between the inner and outer radii, $r_{in}$ and $r_{out}$, $$\alpha_x = \frac{\|I'_x\| - r_{in}}{r_{out} - r_{in}}$$

Bounding Cubes will now be described. One drawback of multidimensional decision boundaries is that they assume the data follows a convoluted normal distribution; however, the camera response usually produces banana-like shapes. One way to account for this is to project each pixel onto each principle axis and solve each one dimensional problem separately. When these clipping planes are combined, a bounding box is formed that defines the decision boundary of the classifier. Given an inner and outer axis-aligned bounding cube of sizes $d_{in}$ and $d_{out}$, we use the projected Euclidean distance from each plane to calculate the opacity $$\alpha_x = \frac{\max(I'_x) - d_{in}}{d_{out} - d_{in}}$$

where $\max(I'_x)$ is the maximum of the absolute values of $I'_x$.

Error Minimization will now be described. Since any single-observation chroma-key classifier computes an under-constrained problem and current VST-HMDs transmit with high signal noise, there may be error in the alpha matte obtained from the geometric color classifier. Natural image matting research solves for opacity values in unknown regions of a trimap, by solving a Laplace equation constrained by known alpha values. These more general algorithms do not directly take advantage of chroma key information or consider high signal noise. Also, they require a defined trimap, usually manually created by a user. An approach herein uses the classifier's output as the constraints, i.e., the trimap. This allows solving a least squared error problem based on a useful observation: similarly colored pixels within a small neighborhood should have similar opacity values.

$$E(\alpha) = \sum_{I_x \in I} \sum_{I_y \in N(I_x)} v(x, y)(\alpha_x - \alpha_y)^2$$

where $v(x, y)$ is the affinity function that relates each pixel, $I_x$, to the elements of its neighborhood, $I_y \in N(I_x)$. Pixels classified with strong probabilities ($\alpha_x=1$ and $\alpha_x=0$) are constraints. Herein it is assumed the weight vector is normalized, not that the weights sum to unity. Given two neighboring pixels we can define the affinity function, $v(x, y)$, as follows:

$$v_o(x,y) = e^{-\|I_x - I_y\|^2 / 2\sigma_o^2}$$

In natural image matting, the assumed global color variance, $\sigma_o^2$, is not optimal. However, in this specific domain, a large portion of the variance comes from signal noise, making this affinity function viable. In general, the specified variance can be at least the measured camera noise. In practice, we may specify a higher variance to allow local image smoothing. Given the above two equations, gradient descent can now minimize the error in hardware. This is achieved by taking the partial derivative of the error function at each pixel and iteratively updating the alpha matte in parallel, $$\frac{\partial E(\alpha)}{\partial \alpha_x} = \sum_{I_y \in N(I_x)} 4 \cdot v(x, y)(\alpha_x - \alpha_y)$$

In practice, we may solve the pixels with weak probabilities to clip fragments in the constraints. The number of required iterations and neighborhood size depends on the quality of the camera and the size of the video capture. Empirically, the system may usually require fewer than twenty iterations with a neighborhood of size four for each captured frame.

Experiments will now be described. HMDs enable the interactive MR environment by providing video streams for blending virtual and real objects. Unfortunately, the low resolution and high signal noise produced by these optical devices demand a noise-tolerant chroma key matte algorithm. The robustness of the method is demonstrated by comparing the various decision boundaries to other known chroma keying solutions using cameras with different levels of signal noise. In these experiments three cameras were considered: a Canon VH-2002 HMD, a Panasonic 3CCD AG-DVX100P, and a Canon Rebel SLR. To reduce the signal noise, digital transfers where used when available. Otherwise, Osprey-I 00 capture cards and S-Video connections were used. Since capture cards may also contribute noise, the cabling and capture card are considered as part of the test camera. Care is taken to synchronize the color temperature and white balance for each camera.

Since camera noise proportionally decreases matte quality, the camera noise is quantified for each camera to find a numerical relation. This is done by producing a digital image of a solid color and displaying it on a LCD monitor in a dark room. Given an input image sequence from each camera, the variance of the image is measured when capturing pure grey. Other test color values, such as black, white, red, green, and blue, do not provide as consistent data for the different cameras.

Once the camera noise is known, the performance is evaluated for different chroma keying algorithms with respect to noise. To obtain a quantitative result of the keying algorithms, the misclassification rate is calculated for each algorithm on still images acquired from each camera. Ground truth is determined by manually matting each image. Then, each algorithm classifies the images, and their mattes are compared against the reference mattes. Note that to simplify the comparison of the continuous classifiers the mattes are discretized to boolean values.

Turning now to the results, the keying algorithm performed well on the low noise images from the Canon SLR. The image was taken against a chroma key blue curtain and demonstrated that the algorithm of the present method is robust enough to properly matte regions containing undesired shadows in the background. This method handles these imperfections due to the trained approximate isotropic chroma key space enabling the use of simple decision boundaries to classify the colors. No visual difference was noted when compositing a scene with either the present method (algorithm) or the offline Discreet Combustion result.

In addition to unwanted shadows in the key, camera noise also requires a robust classifying algorithm to handle variations from the key color spectrum. The HMD camera used for MR experiences contains the most noise with respect to all of the tested cameras. In an example, the HMD's standard deviation from the grey color indicated that over 30% of the pixels were far enough away from the mean that many chroma keyers will improperly classify a large majority of the matte.

To determine the robustness of each algorithm with respect to camera noise, six different algorithms were studied with respect to how they performed against hand-keyed images. A still image was used from each of the three cameras. The mattes were then calculated with each of the six algorithms. In this experiment, the Canon Rebel had the highest number of misclassifications, which is consistent across all algorithms due to the decreased depth-of-field introducing more blurred regions. When considering the Panasonic 3CCD, all algorithms except for the bounding box and ellipsoid worked very well. In the noisy Canon HMD, we notice that all three of the algorithms have lower misclassification rates then the other three solutions.

When inspecting the mattes produced from still images, it was noticed that two of the other algorithms simply cut the color space on the blue boundary. This was seen by triangular shapes in the color diagram mattes. These cuts implied that the decision volume contains considerably more of the color spectrum than necessary for keying color, which may lead to errors when introducing more colors into the image. All three of the algorithms occupy a much smaller volume, showing that they minimize key color spectrum necessary for matting.

The present method's GPU amenable chroma keying method provides a robust and affordable method for matting in Mixed Reality (MR). The use of the isotropic chroma key space, defined by PCA, enables us to use simple geometric shapes to construct the decision boundaries surrounding the key color spectrum. This results in matte quality comparable to commercial offline solutions but with a minimal key color spectrum to improve the tolerance of the chroma key algorithm with respect to noise. Statistically-based methods may also be useful for improving temporal coherence of the matte or reducing the "blue-spill" while maintaining the necessary performance and cost required for MR. The present inventive method provides a robust, fast, and affordable solution to composite virtual and real scenes with chroma key matting.

An exemplary system for implementing the invention includes a computing device or a network of computing devices. In a basic configuration, computing device may include any type of stationary computing device or a mobile computing device. Computing device typically includes at least one processing unit and system memory. Depending on the exact configuration and type of computing device, system memory may be volatile (such as RAM), non-volatile (such as ROM, flash memory, and the like) or some combination of the two. System memory typically includes operating system, one or more applications, and may include program data. Computing device may also have additional features or functionality. For example, computing device may also include additional data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules or other data. System memory, removable storage and non-removable storage are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other physical medium which can be used to store the desired information and which can be accessed by computing device. Any such computer storage media may be part of device. Computing device may also have input device(s) such as a keyboard, mouse, pen, voice input device, touch input device, etc. Output device(s) such as a display, speakers, printer, etc. may also be included. Computing device also contains communication connection(s) that allow the device to communicate with other computing devices, such as over a network or a wireless network. By way of example, and not limitation, communication connection(s) may include wired media such as a wired network or direct-wired connection, and wireless media such as acoustic, RF, infrared and other wireless media.

Computer program code for carrying out operations of the invention described above may be written in a high-level programming language and GPU programming languages, such as CG, HLSL, GLSL, C or C++, for development convenience. In addition, computer program code for carrying out operations of embodiments of the present invention may also be written in other programming languages, such as, but not limited to, interpreted languages. Some modules or routines may be written in assembly language or even microcode to enhance performance and/or memory usage. It will be further appreciated that the functionality of any or all of the program modules may also be implemented using discrete hardware components, one or more application specific integrated circuits (ASICs), or a programmed digital signal processor or microcontroller. A code in which a program of the present invention is described can be included as a firmware in a RAM, a ROM and a flash memory. Otherwise, the code can be stored in a tangible computer-readable storage medium such as a magnetic tape, a flexible disc, a hard disc, a compact disc, a photo-magnetic disc, a digital versatile disc (DVD). The present invention can be configured for use in a computer or an information processing apparatus which includes a memory, such as a central processing unit (CPU), a RAM and a ROM as well as a storage medium such as a hard disc.

The "step-by-step process" for performing the claimed functions herein is a specific algorithm, and may be shown as a mathematical formula, in the text of the specification as prose, and/or in a flow chart. The instructions of the software program create a special purpose machine for carrying out the particular algorithm. Thus, in any means-plus-function claim herein in which the disclosed structure is a computer, or microprocessor, programmed to carry out an algorithm, the disclosed structure is not the general purpose computer, but rather the special purpose computer programmed to perform the disclosed algorithm.

A general purpose computer, or microprocessor, may be programmed to carry out the algorithm/steps of the present invention creating a new machine. The general purpose computer becomes a special purpose computer once it is programmed to perform particular functions pursuant to instructions from program software of the present invention. The instructions of the software program that carry out the algorithm/steps electrically change the general purpose computer by creating electrical paths within the device. These electrical paths create a special purpose machine for carrying out the particular algorithm/steps.

It should be understood that the examples and embodiments described herein are for illustrative purposes only and that various modifications or changes in light thereof will be suggested to persons skilled in the art and are to be included within the spirit and purview of this application.

The invention claimed is:

1. A method for generating an alpha matte based on chromakey information in real-time, comprising:
    (a) off-line training comprising calibration of chroma key parameterization by sampling chroma color and statistically analyzing invariant properties of chroma key pixels using principal component analysis (PCA) to transform the chroma color into a transformed color space;
    (b) real-time classification via a processor comprising estimating an alpha matte using a classifier to classify pixels, p, in a video frame using geometric objects whose boundaries define opacity used for alpha matting;
    (c) outputting a resulting alpha matte to allow for alpha blending to composite a virtual scene with a video feed.

2. The method of claim 1 further comprising the step of error minimization for improving the alpha matte comprising accounting for misclassifications and signal noise prior to outputting the resulting alpha matte.

3. The method of claim 1 wherein the off-line training comprises:
    (a) randomly sampling chroma color from several viewing angles and positions of an of image I using a target camera to produce N number of triplet data points representing a data set of chroma key pixels;
    (b) running principle components analysis (PCA) using the N number of triplet data points as input to find an orthonormal vector basis by calculating eigenvectors $e_1$ $e_2$ $e_3$ having nine values and three three-dimensional (3D) vectors, eigenvalues $\lambda_1, \lambda_2, \lambda_3$ having three values, and means having three values of the data set;
    (c) constructing a whitening function from a mean vector ($\mu$), column-major matrix of eigenvectors ($E=[e_1\ e_2\ e_3]$), and diagonal matrix of eigenvalues ($\Lambda=\text{diag}(\lambda_1, \lambda_2, \lambda_3)$) comprising $$M(I_x)=\Lambda^{-1/2}E^T(I_x-\mu);\text{ and}$$

(d) outputting a triplet of a value for the chroma color, wherein the color triplet's Euclidean distance is directly related to a probability that the color exists in the chroma key; and
wherein:
    $M(I_x)$ is the whitening function applied to an input pixel $I_x$ of image I to produce a transformed pixel, $I'_x$;
    E is the column-major matrix of eigenvectors $e_1$ $e_2$ $e_3$;
    $\Lambda$ is the diagonal matrix of eigenvalues $\lambda_1, \lambda_2, \lambda_3$.

4. The method of claim 3 wherein the real-time classification comprises:
    (a) for all pixels, p, in the video frame:
        (i) calculate $z=M(p)$, wherein z is a triplet representing standard deviations in three independent dimensions of pixel p in chroma color distribution;
        (ii) receive a selection of a classifier function, C, and compute $\alpha=C(z)$, where $\alpha$ is the alpha channel of the pixel p;
    (b) outputting the alpha matte;
wherein:
    $M(p)$ is the whitening function applied to pixel p.

5. The method of claim 4 wherein the classifier comprises a geometric object selected from a sphere or a cube.

6. The method of claim 4 wherein the classifier comprises a geometric object represented by a sphere wherein data distribution is a 3D Gaussian, comprising:
    (a) calculating a 3D distance to a mean in the transformed color space wherein $d=\text{magnitude}(z)$;
    (b) using the data distribution to find a lower and upper bound on single dimension z-score wherein d is used with the upper and lower bounds; and
    (c) calculating the alpha by linearly interpolating d between the lower and upper bound.

7. The method of claim 6 wherein for a given transformed pixel, $I'_x$, using Euclidean distance from an origin with linear interpolation between an inner and outer radii, $r_{in}$ and $r_{out}$ calculating opacity, $\alpha_x$, as:

$$\alpha_x = \frac{\|I'_x\| - r_{in}}{r_{out} - r_{in}}.$$

8. The method of claim 4 wherein the classifier comprises a geometric object represented by a cube having each dimension of the data distribution follows a Gaussian distribution, comprising:
    (a) calculating each 1D distance to a mean in a transformed color space for each dimension ($d_i=\text{abs}(z_i)$);
    (b) assuming the worst z score ($d_i$) encloses the data distribution best, reducing dimensionality by taking a maximum distance $d_{max}$ across the first two or all three dimensions;
    (c) using the data distribution, finding a lower and upper bound on single dimension z-score; and
    (d) calculating the alpha by linearly interpolating $d_{max}$ between the lower and upper bound.

9. The method of claim 8 wherein, for a given transformed pixel, $I'_x$, given an inner and outer axis-aligned bounding cube of sizes $d_{in}$ and $d_{out}$, use a projected Euclidean distance from each plane to calculate an opacity, $\alpha_x$, as:

$$\alpha_x = \frac{\max(I'_x) - d_{in}}{d_{out} - d_{in}}$$

where
$\max(I'_x)$ is a maximum of absolute values of transformed pixel $I'_x$;
$d_{in}$ is the distance from the origin to the inner plane;
$d_{out}$ is the distance from the origin to the outer plane.

10. The method of claim 1 wherein the processor is a graphics processing unit (GPU) operating at high frame rates.

11. The method of claim 10 further comprising:
given four images of foreground, background, video, and matte, compositing the images using a three layer blending function.

12. A system for generating an alpha matte based on chroma key information in real-time, said system comprising: a display device; a memory; and a processor with hardware and software components for:
(a) off-line training comprising calibration of chroma key parameterization by sampling chroma color and statistically analyzing invariant properties of chroma key pixels using principal component analysis (PCA) to transform the chroma color into a transformed color space;
(b) real-time classification via a processor comprising estimating an alpha matte using a classifier to classify pixels, p, in a video frame using geometric objects whose boundaries define opacity used for alpha matting;
(c) outputting a resulting alpha matte to allow for alpha blending to composite a virtual scene with a video feed.

13. The system of claim 12 further comprising a software component for error minimization for improving the alpha matte comprising accounting for misclassifications and signal noise prior to outputting the resulting alpha matte.

14. The system of claim 12 wherein the off-line training comprises:
(a) randomly sampling chroma color from several viewing angles and positions of an of image I using a target camera to produce N number of triplet data points representing a chroma key pixel in a data set;
(b) running principle components analysis (PCA) using the N number of triplet data points as input to find an orthonormal vector basis by calculating eigenvectors $e_1$ $e_2$ $e_3$ having nine values and three three-dimensional (3D) vectors, eigenvalues $\lambda_1, \lambda_2, \lambda_3$ having three values, and means having three values of the data set;
(c) constructing a whitening function from a mean vector ($\mu$), column-major matrix of eigenvectors (E=[$e_1$ $e_2$ $e_3$]), and diagonal matrix of eigenvalues ($\Lambda$=diag ($\lambda_1, \lambda_2, \lambda_3$)) comprising $$M(I_x) = \Lambda^{-1/2} E^T (I_x - \mu); \text{ and}$$

(d) outputting a triplet of a non-negative value for the chroma color, wherein the color triplet's Euclidean distance is directly related to a probability that the color exists in the chroma key; and
wherein:
$M(I_x)$ is the whitening function applied to an input pixel $I_x$ of image I to produce a transformed pixel, $I'_x$;
E is the column-major matrix of eigenvectors $e_1$ $e_2$ $e_3$;
$\Lambda$ is the diagonal matrix of eigenvalues $\lambda_1, \lambda_2, \lambda_3$.

15. The system of claim 14 wherein the real-time classification comprises:
(a) for all pixels, p, in the video frame:
(i) calculate z=M(p), wherein z is a triplet representing standard deviations in three independent dimensions of pixel p in chroma color distribution;
(ii) receive a selection of a classifier function, C, and compute $\alpha$=C(z), where $\alpha$ is the alpha channel of the pixel p;
(b) outputting the alpha matte
wherein:
M(p) is the whitening function applied to pixel p.

16. An article of manufacture comprising: a computer usable medium having computer readable code means embodied therein for:
(a) off-line training comprising calibration of chroma key parameterization by sampling chroma color and statistically analyzing invariant properties of chroma key pixels using principal component analysis (PCA) to transform the chroma color into a transformed color space;
(b) real-time classification via a processor comprising estimating an alpha matte using a classifier to classify pixels, p, in a video frame using geometric objects whose boundaries define opacity used for alpha matting;
(c) outputting a resulting alpha matte to allow for alpha blending to composite a virtual scene with a video feed.

17. The article of manufacture of claim 16 further comprising computer readable code means for error minimization for improving the alpha matte comprising accounting for misclassifications and signal noise prior to outputting the resulting alpha matte.

18. The article of manufacture of claim 16 wherein the computer readable code means for off-line training comprises:
(a) randomly sampling chroma color from several viewing angles and positions of an of image I using a target camera to produce N number of triplet data points representing a pixel in a data set;
(b) running principle components analysis (PCA) using the N number of triplet data points as input to find an orthonormal vector basis by calculating eigenvectors $e_1$ $e_2$ $e_3$ having nine values and three three-dimensional (3D) vectors, eigenvalues $\lambda_1, \lambda_2, \lambda_3$ having three values, and means having three values of the data set;
(c) constructing a whitening function from a mean vector ($\mu$), column-major matrix of eigenvectors (E=[$e_1$ $e_2$ $e_3$]), and diagonal matrix of eigenvalues ($\Lambda$=diag ($\lambda_1, \lambda_2, \lambda_3$)) comprising $$M(I_x) = \Lambda^{-1/2} E^T (I_x - \mu); \text{ and}$$

(d) outputting a triplet of a value, wherein the color triplet's Euclidean distance is directly related to a probability that the color exists in the chroma key; and
wherein:
$M(I_x)$ is the whitening function applied to an input pixel $I_x$ of image I to produce a transformed pixel, $I'_x$;
E is the column-major matrix of eigenvectors $e_1$ $e_2$ $e_3$;
$\Lambda$ is the diagonal matrix of eigenvalues $\lambda_1, \lambda_2, \lambda_3$.

19. The article of manufacture of claim 18 wherein the computer readable code means for real-time classification comprises:
(a) for all pixels, p, in the video frame:
(i) calculate z=M(p), wherein z is a triplet representing standard deviations in three independent dimensions of pixel p in chroma color distribution;

(ii) receive a selection of a classifier function, C, and compute $\alpha=C(z)$, where $\alpha$ is the alpha channel of the pixel p;

(b) outputting the alpha matte wherein:

M(p) is the whitening function applied to pixel p.

20. A computer system for an alpha matte based on the chromakey information in real-time configured to cause one or more computer processors to perform the steps recited in claim 1.

* * * * *